(12) United States Patent
Hill et al.

(10) Patent No.: US 8,097,565 B2
(45) Date of Patent: Jan. 17, 2012

(54) SILICONE HYDROGELS HAVING CONSISTENT CONCENTRATIONS OF MULTI-FUNCTIONAL POLYSILOXANES

(75) Inventors: Gregory A. Hill, Atlantic Beach, FL (US); John C. Heaton, Atlantic Beach, FL (US); Michael R. Clark, Jacksonville, FL (US); Shivkumar Mahadevan, Orange Park, FL (US); Carrie L Caison, Jacksonville, FL (US); Frank F. Molock, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1771 days.

(21) Appl. No.: 10/861,798

(22) Filed: Jun. 4, 2004

(65) Prior Publication Data

US 2005/0255231 A1    Nov. 17, 2005

Related U.S. Application Data (60) Provisional application No. 60/483,847, filed on Jun. 30, 2003.

(51) Int. Cl.
*C40B 40/00* (2006.01)
(52) U.S. Cl. .......................................... 506/14
(58) Field of Classification Search ............... 504/14
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 4,113,224 A | 9/1978 | Clark et al. | |
| 4,120,570 A | 10/1978 | Gaylord | |
| 4,139,513 A | 2/1979 | Tanaka et al. | |
| 4,139,692 A | 2/1979 | Tanaka et al. | |
| 4,190,277 A | 2/1980 | England | |
| 4,197,266 A | 4/1980 | Clark et al. | |
| 4,259,467 A | 3/1981 | Keogh et al. | |
| 4,260,725 A | 4/1981 | Keogh et al. | |
| 4,261,875 A | 4/1981 | LeBoeuf | |
| 4,495,313 A | 1/1985 | Larsen | |
| 4,507,452 A * | 3/1985 | Foley | 526/279 |
| 4,649,184 A | 3/1987 | Yoshikawa et al. | |
| 4,680,336 A | 7/1987 | Larsen et al. | |
| 4,740,533 A | 4/1988 | Su et al. | |
| 4,889,664 A | 12/1989 | Kindt-Larsen et al. | |
| 5,006,622 A | 4/1991 | Kunzler et al. | |
| 5,039,459 A | 8/1991 | Kindt-Larsen et al. | |
| 5,070,215 A | 12/1991 | Bambury et al. | |
| 5,256,751 A | 10/1993 | Vanderlaan | |
| 5,311,223 A | 5/1994 | Vanderlaan | |
| 5,321,108 A | 6/1994 | Kunzler et al. | |
| 5,387,662 A | 2/1995 | Kunzler et al. | |
| 5,539,016 A | 7/1996 | Kunzler et al. | |
| 5,994,488 A | 11/1999 | Yokota et al. | |
| 6,818,719 B2 * | 11/2004 | Fujisawa et al. | 526/323.2 |
| 2002/0016383 A1 | 2/2002 | Iwata et al. | |
| 2004/0014921 A1 | 1/2004 | Fujisawa et al. | |
| 2004/0106694 A1 | 6/2004 | Fujisawa et al. | |
| 2004/0119176 A1 * | 6/2004 | Xia et al. | 264/1.32 |

FOREIGN PATENT DOCUMENTS

| | | |
|---|---|---|
| EP | 080539 | 6/1983 |
| EP | 0 266 895 A2 | 5/1988 |
| EP | 0266895 | 5/1988 |
| WO | WO/02/31007 * | 4/2002 |
| WO | WO 02/31007 | 4/2002 |
| WO | WO 02/31007 A1 | 4/2002 |
| WO | WO 02/081485 | 10/2002 |
| WO | WO 02/081485 A1 | 10/2002 |
| WO | WO 03/022321 A2 | 3/2003 |
| WO | WO 03/022322 | 3/2003 |
| WO | WO 2005005517 A2 | 1/2005 |

OTHER PUBLICATIONS

PCT International Search Report, dated Jan. 13, 2005, for PCT Int'l Appln. No. PCT/US2004/021071.
Encyclopedia of Polymer Science and Engineering, N-Vinyl Amide Polymers, Second edition, vol. 17, pp. 198-257, John Wiley & Sons Inc.
Volume III, Photoinitiators for Free Radical Cationic & Anionic Photopolymerization, $2^{nd}$ Edition by J.V. Crivello & K. Dietliker; edited by G. Bradley; John Wiley and Sons; New York; 1998.
Crivello & K. Dietliker vol. III, Photoinitiators for Free Radical Cationic & Anionic Photopolymerization, $2^{nd}$ Edition by J.V.; edited by G. Bradley; John Wiley and Sons; New York; 1998.

* cited by examiner

*Primary Examiner* — Ardin Marschel
*Assistant Examiner* — Christian Boesen
(74) *Attorney, Agent, or Firm* — Karen A. Harding (57) ABSTRACT

The present invention relates to a process comprising forming a monomer mixture comprising at least one monofunctional silicone containing component which comprises at least one difunctional byproduct and adding to said monomer mixture a normalizing amount of said at least one difunctional byproduct and curing said monomer mixture to form a biomedical device.

22 Claims, 1 Drawing Sheet

SILICONE HYDROGELS HAVING CONSISTENT CONCENTRATIONS OF MULTI-FUNCTIONAL POLYSILOXANES

RELATED PATENT APPLICATIONS

This patent application claims priority of a provisional application, U.S. Ser. No. 60/483,847 which was filed on Jun. 30, 2003.

FIELD OF THE INVENTION

The present invention relates to silicone hydrogels having consistent concentrations of multifunctional components and more particularly multifunctional silicone containing components. Processes for making silicone hydrogels having consistent concentrations of multifunctional components are also disclosed.

BACKGROUND OF THE INVENTION

Much effort has been made to increase the oxygen permeability of a contact lens to a level where the lens may be worn for extended periods of time without significant corneal swelling. One approach to increasing the oxygen permeability has been to include silicone monomers into materials used to form the contact lens. However, these silicone monomers tend to be large molecules, which may have many byproducts.

Various silicone containing monomers have found utility as starting materials in the production of medical devices, such as ophthalmic devices and particularly, soft contact lenses having improved permeability to oxygen. One class of suitable monomers includes tris and bis(trimethylsilyloxy) silylalkylglycerol methacrylates ("SiAGMA"). During the synthesis of SiAGMA certain diester acrylate impurities are also generated. The diester acrylates or free radical reactive difunctional groups act as crosslinkers during the polymerization of the SiAGMAs with other polymer forming components. Unfortunately, it can be difficult to control the amount of difunctional byproducts which are formed. The difunctional byproducts effect many of the properties of the lens, including modulus, equilibrium water content and elongation. Accordingly, the concentration of the difunctional byproducts must be controlled to ensure that the mechanical properties of the resulting medical device do not vary to an unacceptable degree.

SUMMARY OF THE INVENTION

The present invention relates to control of contact lens parameters and properties via modulation of the concentration in the monomer mix of difunctional silicone-containing byproducts formed during the synthesis of the starting materials. More specifically the present invention relates to a process comprising forming a monomer mixture comprising at least one monofunctional silicone containing component which comprises at least one difunctional byproduct and adding to said monomer mixture a normalizing amount of said at least one difunctional byproduct and curing said monomer mixture to form a biomedical device.

DESCRIPTION OF THE INVENTION

The present invention relates to compositions comprising at least one hydrophilic component, at least one monofunctional silicone component, and a normalizing amount of at least one difunctional silicone containing byproduct.

As used herein "byproduct", refers to a composition which is formed as a coproduct during the synthesis of a mono functional silicone containing component.

As used herein, a "biomedical device" is any article that is designed to be used while either in or on mammalian tissues or fluid, and preferably in or on human tissue or fluids. Examples of these devices include but are not limited to catheters, implants, stents, and ophthalmic devices such as intraocular lenses and contact lenses. The preferred biomedical devices are ophthalmic devices, particularly contact lenses, most particularly contact lenses made from silicone hydrogels.

As used herein, the terms "lens" and "ophthalmic device" refer to devices that reside in or on the eye. These devices can provide optical correction, wound care, drug delivery, diagnostic functionality, cosmetic enhancement or effect or a combination of these properties. The term lens includes but is not limited to soft contact lenses, hard contact lenses, intraocular lenses, overlay lenses, ocular inserts, and optical inserts.

As used herein the term "silicone containing compatibilizing component" means reaction components which contain at least one silicone and at least one hydroxyl group. Such components have been disclosed in WO03/022321 and WO03/022322.

The one or more silicone-containing components and one or more hydrophilic components used to make the polymer of this invention can be any of the known components used in the prior art to make silicone hydrogels. These terms silicone-containing component and hydrophilic component are not mutually exclusive, in that, the silicone-containing component can be somewhat hydrophilic and the hydrophilic component can comprise some silicone, because the silicone-containing component can have hydrophilic groups and the hydrophilic components can have silicone groups.

The term "monomer" used herein refers to low molecular weight compounds (i.e. typically having number average molecular weights less than 1100 g/mol) that can be polymerized.

A monofunctional silicone-containing monomer is one that contains only one polymerizable group and at least one [—Si—O—Si] group. Preferably, the Si and attached O are present in the silicone-containing component in an amount greater than 20 weight percent, and more preferably greater than 30 weight percent of the total molecular weight of the silicone-containing monomer. As used herein "polymerizable group" means any group which is capable of undergoing radical or ionic polymerization. Preferred polymerizable groups include free radical reactive groups, such as an acrylate, a styryl, vinyl, vinyl ether, itaconate group, a $C_{1-6}$alkylacrylate, acrylamide, $C_{1-6}$alkylacrylamide, N-vinyllactam, N-vinylamide, $C_{2-12}$alkenyl, $C_{2-12}$alkenylphenyl, $C_{2-12}$alkenylnaphthyl, or $C_{2-6}$alkenylphenyl$C_{1-6}$alkyl or a cationic polymerizable group such as vinyl ether or epoxide groups. Methacrylate is a preferred polymerizable group.

Useful monofunctional silicone-containing monomers preferably comprise polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,740,533; 5,070,215, and EP080539. All of the patents cited herein are hereby incorporated in their entireties by reference. These references disclose many examples of olefinic silicone-containing monomers.

A preferred class of monofunctional silicone-containing components include "hydroxyl-functionalized silicone containing monomers" which contain at least one polymerizable group having an average molecular weight of about less than 5000 Daltons as measured via gel permeation chromatography, refractive index detection, and preferably less than about 3000 Daltons, comprise at least one hydroxyl group and at least one "—Si—O—Si—" group.

Examples of hydroxyl-functionalized silicone containing monomers include monomers of Formula I wherein:

$R^1$ is hydrogen, $C_{1-6}$alkyl;

$R^2$, $R^3$, and $R^4$, are independently, $C_{1-6}$alkyl, tri$C_{1-6}$alkylsiloxy, phenyl, naphthyl, substituted $C_{1-6}$alkyl, substituted phenyl, or substituted naphthyl
where the alkyl substitutents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl, and
where the aromatic substitutents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl;

$R^5$ is hydroxyl, an alkyl group containing one or more hydroxyl groups; or
$(CH_2(CR^9R^{10})_yO)_x$—$R^{11}$ wherein y is 1 to 5, preferably 1 to 3, x is an integer of 1 to 100, preferably 2 to 90 and more preferably 10 to 25; $R^9$-$R^{11}$ are independently selected from H, alkyl having up to 10 carbon atoms and alkyls having up to 10 carbon atoms substituted with at least one polar functional group, $R^6$ is a divalent group comprising up to 20 carbon atoms;
$R^7$ is a monovalent group that can polymerize under free radical and/or cationic polymerization and comprising up to 20 carbon atoms
$R^8$ is a divalent or trivalent group comprising up to 20 carbon atoms.

Reaction mixtures of the present invention may include more than one hydroxyl-functionalized silicone containing monomer.

For monofunctional hydroxyl functionalized silicone containing monomer the preferred $R^1$ is hydrogen, and the preferred $R^2$, $R^3$, and $R^4$, are $C_{1-6}$alkyl and tri$C_{1-6}$alkylsiloxy, most preferred methyl and trimethylsiloxy.

The preferred $R^5$ is hydroxyl, —CH$_2$OH or CH$_2$CHOHCH$_2$OH, with hydroxyl being most preferred.

The preferred $R^6$ is a divalent $C_{1-6}$alkyl, $C_{1-6}$alkyloxy, $C_{1-6}$alkyloxy$C_{1-6}$alkyl, phenylene, naphthalene, $C_{1-12}$cycloalkyl, $C_{1-6}$alkoxycarbonyl, amide, carboxy, $C_{1-6}$alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-12}$cycloalkyl, where the substituents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl. The particularly preferred $R^6$ is a divalent methyl(methylene).

The preferred $R^7$ comprises a free radical reactive group, such as an acrylate, a styryl, vinyl, vinyl ether, itaconate group, a $C_{1-6}$alkylacrylate, acrylamide, $C_{1-6}$alkylacrylamide, N-vinyllactam, N-vinylamide, $C_{2-12}$alkenyl, $C_{2-12}$alkenylphenyl, $C_{2-12}$alkenylnaphthyl, or $C_{2-6}$alkenylphenyl $C_{1-6}$alkyl or a cationic reactive group such as vinyl ether or epoxide groups. The particularly preferred $R^7$ is methacrylate.

The preferred $R^8$ is a divalent $C_{1-6}$alkyl, $C_{1-6}$alkyloxy, $C_{1-6}$alkyloxy$C_{1-6}$alkyl, phenylene, naphthalene, $C_{1-12}$cycloalkyl, $C_{1-6}$alkoxycarbonyl, amide, carboxy, $C_{1-6}$alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-12}$cycloalkyl, where the substituents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl. The particularly preferred $R^8$ is $C_{1-6}$alkyloxy$C_{1-6}$alkyl.

Examples of hydroxyl-functionalized silicone containing monomer of Formula I that are particularly preferred are 2-propenoic acid, 2-methyl-,2-hydroxy-3-[3-[1,3,3,3-tetramethyl-1-[(trimethylsilyl)oxy]disiloxanyl]propoxy]propyl ester (which can also be named (3-methacryloxy-2-hydroxypropyloxy)propylbis(trimethylsiloxy)methylsilane)

The above compound, (3-methacryloxy-2-hydroxypropyloxy)propylbis(trimethylsiloxy)methylsilane is formed from an epoxide, which produces an 80:20 mixture of the compound shown above and (2-methacryloxy-3-hydroxypropyloxy)propylbis(trimethylsiloxy)methylsilane. In some embodiments of the present invention it is preferred to have some amount of the primary hydroxyl present, preferably greater than about 10 wt % and more preferably at least about 20 wt %.

Other suitable hydroxyl-functionalized silicone containing monomers include (3-methacryloxy-2-hydroxypropyloxy)propyltris(trimethylsiloxy)silane

3-methacryloxy-2-(2-hydroxyethoxy)propyloxy)propylbis(trimethylsiloxy)methylsilane The reaction products of glycidyl methacrylate with amino-functional polydimethylsiloxanes may also be used as a hydroxyl-functional silicone containing monomer. Other suitable hydroxyl-functional silicone containing monomers include those disclosed in columns 6,7 and 8 of U.S. Pat. No. 5,994,488, and monomers disclosed in U.S. Pat. Nos. 4,259,467; 4,260,725; 4,261,875; 4,649,184; 4,139,513, 4,139,692, US 2002/0016383, U.S. Pat. Nos. 4,139,513 and 4,139,692. These and any other patents or applications cited herein are incorporated by reference.

Another class of suitable monofunctional silicone-containing monomers are polysiloxanylalkyl(meth)acrylic monomers represented by the following formula:

Formula II wherein: $R^{12}$ denotes H or lower alkyl; X denotes O or $NR^{16}$; each $R^{16}$ independently denotes hydrogen or lower alkyl,
    each $R^{13}$-$R^{15}$ independently denotes a lower alkyl radical or a phenyl radical, and
    b is 1 or 3 to 10.

Examples of these polysiloxanylalkyl(meth)acrylic monomers include methacryloxypropyl tris(trimethylsiloxy)silane, pentamethyldisiloxanyl methylmethacrylate, and methyldi(trimethylsiloxy)methacryloxymethyl silane. Methacryloxypropyl tris(trimethylsiloxy)silane is the most preferred.

Another preferred class of monofunctional silicone-containing components is a poly(organosiloxane)prepolymer represented by formula II:

Formula III wherein A independently denotes an activated unsaturated group, such as an ester or amide of an acrylic or a methacrylic acid or an alkyl or aryl group (providing that at least one A comprises an activated unsaturated group capable of undergoing radical polymerization); each of $R^{17}$, $R^{18}$, $R^{19}$ and $R^{20}$ are independently selected from the group consisting of a monovalent hydrocarbon radical or a halogen substituted monovalent hydrocarbon radical having 1 to 18 carbon atoms which may have ether linkages between carbon atoms;
    $R^{21}$ denotes a divalent hydrocarbon radical having from 1 to 22 carbon atoms, and
    m is 0 or an integer greater than or equal to 1, and preferable 5 to 400, and more preferably 10 to 300. One specific example is monomethacryloxypropyl terminated mono-n-butyl terminated polydimethylsiloxane (mPDMS).

Another useful class of silicone containing components includes silicone-containing vinyl carbonate or vinyl carbamate monomers of the following formula:

Formula IV wherein: Y denotes O, S. or NH; $R^{si}$ denotes a silicone-containing organic radical; R denotes hydrogen or methyl; d is 1, 2, 3 or 4; and q is 0 or 1. Suitable silicone-containing organic radicals $R^{si}$ include the following:

wherein: p is 1, 2, 3 or 4; and s is 0, 1, 2, 3, 4 or 5.

The silicone-containing vinyl carbonate or vinyl carbamate monomers specifically include: 3-(vinyloxycarbonylthio) propyl-[tris(trimethylsiloxysilane)]; 3-[tris(trimethylsiloxy) silyl]propyl allyl carbamate; 3-[tris(trimethylsiloxy)silyl] propyl vinyl carbamate; trimethylsilylethyl vinyl carbonate; trimethylsilylmethyl vinyl carbonate.

Other monofunctional silicone-containing components suitable for use in this invention include those described in U.S. Pat. Nos. 5,321,108; 5,387,662 and 5,539,016, which describe polysiloxanes with a polar fluorinated graft or side group having a hydrogen atom attached to a terminal difluoro-substituted carbon atom.

The difunctional silicone containing byproduct is structurally similar to at least one monofunctional silicone containing component. As used herein structurally similar means comprising the same silicone groups and preferably comprising all the same functionality, but for the addition of at least one additional polymerizable group. Examples of suitable difunctional silicone containing byproducts include bis(trimethylsiloxy)methylsilylpropyl-1,2-dimethacrylate and 1,3-bis(3-methacryloxypropyl)tetrakis(trimethylsiloxy)disiloxane, α, ω-bismethacryloypropyl polydimethylsiloxane, mixtures thereof and the like. Examples of multifunctional silicone containing compounds which are structurally similar to monofunctional silicone containing components include bis (trimethylsiloxy)methylsilylpropyl-1,2-dimethacrylate when SiMAA is used, 1,3-bis(3-methacryloxypropyl)tetrakis (trimethylsiloxy)disiloxane when TRIS is used, α, ω-bis-methacryloypropyl polydimethylsiloxane when mPDMS is used, and the like.

It has been found that by including at least one difunctional silicone containing byproduct as a component in the reactive monomer mix, the resulting silicone hydrogels have more uniform physical properties than when a difunctional silicone containing byproduct is not included. Generally, the monofunctional silicone containing component will contain some amount of difunctional silicone containing byproduct. However, many byproducts may be formed during the synthesis of the monofunctional silicone-containing component and it is generally desirable to minimize their concentration in the monofunctional silicone-containing component. However, known purification methods produce monofunctional silicone-containing components with concentrations of difunctional silicone-containing byproducts which can vary by as much as 5 weight %. Unfortunately even small variations in the amount of difunctional impurities, such as the difunctional silicone-containing byproduct can cause significant variance in the physical properties of the finished lens. The present invention solves this problem by adding a normalizing amount of said difunctional silicone-containing byproduct to the monomer mix. Thus, according to the present invention, a specification is set for the amount of the difunctional silicone-containing byproduct in the monomer mix and the amount of difunctional silicone-containing byproduct, above the amount present as an impurity in the monofunctional silicone-containing component necessary to meet the specification is added ("normalizing amount"). Large amounts of the difunctional silicone-containing byproduct are not required. Results according to the present invention may be achieved by including up to about 5 wt % difunctional silicone containing byproduct, based upon the weight of the monofunctional silicone-containing component present and preferably between about 0.1 and about 5 weight %, and more preferably between about 1 and about 3 weight % difunctional silicone containing byproduct based upon the weight of the monofunctional silicone-containing components. In one embodiment a single difunctional byproduct is added in a normalizing amount.

The difunctional silicone-containing byproducts can be made via numerous methods. For example, bis(trimethylsiloxy)methylsilylpropyl-1,2-dimethacrylate may be made by reacting glycidoxypropyl heptamethyltrisiloxane with at least one epoxide opening catalyst, at least one carboxylic acid, at least one protecting agent and at least one inhibitor at a temperature above about 60° C. for at least about 4 hours.

Hydrophilic components include those which are capable of providing at least about 20% and preferably at least about 25% water content to the resulting lens when combined with the remaining reactive components. Suitable hydrophilic components may be present in amounts between about 10 to about 60 weight % based upon the weight of all reactive components. About 15 to about 50 weight % and more preferably between about 20 to about 40 weight %. The hydrophilic monomers that may be used to make the polymers of this invention have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CR'H=CRCOX) wherein R is H or $CH_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

More preferred hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate.

Most preferred hydrophilic monomers include DMA, NVP and mixtures thereof.

In certain embodiments it may be desirable to include a high molecular weight hydrophilic polymer. "High molecular weight hydrophilic polymer" refers to substances having a weight average molecular weight of no less than about 100,000 Daltons, wherein said substances upon incorporation to silicone hydrogel formulations, increase the wettability of the cured silicone hydrogels. The preferred weight average molecular weight of these high molecular weight hydrophilic polymers is greater than about 150,000; more preferably between about 150,000 to about 2,000,000 Daltons, more preferably still between about 300,000 to about 1,800,000 Daltons, most preferably about 500,000 to about 1,500,000 Daltons.

Alternatively, the molecular weight of hydrophilic polymers of the invention can be also expressed by the K-value, based on kinematic viscosity measurements, as described in Encyclopedia of Polymer Science and Engineering, N-Vinyl Amide Polymers, Second edition, Vol 17, pgs. 198-257, John Wiley & Sons Inc. When expressed in this manner, hydrophilic monomers having K-values of greater than about 46 and preferably between about 46 and about 150. The high molecular weight hydrophilic polymers are present in the formulations of these devices in an amount sufficient to provide contact lenses, which without surface modification provide at least a 10% improvement in wettability and preferably provide wettable lenses. For a contact lens "wettable" is a lens which displays an advancing dynamic contact angle of less than about 100°, preferably less than 80° and more preferably less than about 60°

Suitable amounts of high molecular weight hydrophilic polymer include from about 1 to about 15 weight percent, more preferably about 3 to about 15 percent, most preferably about 3 to about 12 percent, all based upon the total of all reactive components.

Examples of high molecular weight hydrophilic polymers include but are not limited to polyamides, polylactones, polyimides, polylactams and functionalized polyamides, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Hydrophilic prepolymers made from DMA or n-vinyl pyrrolidone with glycidyl methacrylate may also be used. The glycidyl methacrylate ring can be opened to give a diol which may be used in conjunction with other hydrophilic prepolymer in a mixed system to increase the compatibility of the high molecular weight hydrophilic polymer, hydroxyl-functionalized silicone containing monomer and any other groups which impart compatibility. The preferred high molecular weight hydrophilic polymers are those that contain a cyclic moiety in their backbone, more preferably, a cyclic amide or cyclic imide. High molecular weight hydrophilic polymers include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyacrylic acid, polyethylene oxide, poly 2 ethyl oxazoline, heparin polysaccharides, polysaccharides, mixtures and copolymers (including block or random, branched, multichain, comb-shaped or star shaped) thereof where poly-N-vinylpyrrolidone (PVP) is particularly preferred. Copolymers might also be used such as graft copolymers of PVP.

Aside from the specifically named high molecular weight hydrophilic polymers, it is expected that any high molecular weight polymer will be useful in this invention provided that when said polymer is added to a silicone hydrogel formulation, the hydrophilic polymer (a) does not substantially phase separate from the reaction mixture and (b) imparts wettability to the resulting cured polymer. In some embodiments it is preferred that the high molecular weight hydrophilic polymer be soluble in the diluent at processing temperatures.

In certain embodiments a hydroxyl containing component is also included. The hydroxyl containing component that may be used to make the polymers of this invention have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. The hydroxyl containing component may also act as a crosslinking agent. In addition the hydroxyl containing component comprises a hydroxyl group. This hydroxyl group may be a primary, secondary or tertiary alcohol group, and may be located on an alkyl or aryl group. Examples of hydroxyl containing monomers that may be used include but are not limited to 2-hydroxyethyl methacrylate, 2-hydroxyethyl acrylate, 2-hydroxyethyl methacrylamide, 2-hydroxyethyl acrylamide, N-2-hydroxyethyl vinyl carbamate, 2-hydroxyethyl vinyl carbonate, 2-hydroxypropyl methacrylate, hydroxyhexyl methacrylate, hydroxyoctyl methacrylate and other hydroxyl functional monomers as disclosed in U.S. Pat. Nos. 5,006,622; 5,070,215; 5,256,751 and 5,311,223. Preferred hydrophilic components include 2-hydroxyethyl methacrylate.

The present invention further comprises a process for providing a silicone hydrogel having consistent mechanical properties and water contents comprising the steps of (a) forming a monomer mix comprising at least one monofunctional silicone containing component, at least one hydrophilic component and a normalizing amount of at least one difunctional silicone containing component and (b) curing said monomer mix to form said silicone hydrogel. The normalizing amount of difunctional silicone containing component is selected to provide the silicone hydrogel with the desired balance of mechanical properties. The normalizing amount may be experimentally determined by making several hydrogels having varying amounts of said multifunctional silicone containing component, measuring the desired physical properties and selecting the level which provides the desired balance of properties.

The biomedical devices, and particularly ophthalmic lenses of the present invention have a balance of properties which makes them particularly useful. Such properties include water content, modulus, elongation and oxygen permeability. Thus, in one embodiment, the biomedical devices are contact lenses having a water content of greater than about 20%, preferably greater than about 25%, and more preferably greater than about 30%.

Suitable oxygen permeabilities are preferably greater than about 40 barrer and more preferably greater than about 60 barrer. Suitable modulus includes those between about 40 and about 100 psi, and preferably between about 50 and about 90 psi. Suitable percent elongation include between about 50 and about 400%, preferably between about 100 and about 300%. The present invention allows for the selection and efficient control of mechanical properties in the manufacture of medical devices and particularly contact lenses. The normalizing amount may be selected by making articles from a series of monomer mixtures having varying amounts of difunctional silicone-containing byproduct, analyzing the properties of the articles so made and selecting a difunctional silicone-containing byproduct based upon the articles properties. Thus, according to the present invention, desirable contact lens properties may be readily maintained without altering the concentration of other impurities present in the monofunctional silicone-containing component.

Also, the biomedical devices, and particularly ophthalmic devices and contact lenses have contact angles (advancing) which are less than about 80°, preferably less than about 70° and more preferably less than about 65°. In preferred embodiments the articles of the present invention have combinations of the above described properties. All combinations of the above ranges are deemed to be within the present invention.

In addition to at least one monofunctional silicone containing monomer, at least one hydrophilic component and a normalizing amount of at least one difunctional silicone containing component, the monomer mix of the present invention comprises other hydrogel forming components which are known in the art, such as cross-linking agents, initiators, tinting agents, UV absorbing compounds and the like.

Suitable cross-linking agents are known in the art and include ethylene glycol dimethacrylate ("EGDMA"), tetraethyleneglycol dimethacrylate ("TEGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. The cross-linking agents are used in the usual amounts, e.g., from about 0.0004 to about 0.02 mole per 100 grams of reactive components in the reaction mixture. (The reactive components are everything in the reaction mixture except the diluent and any additional processing aids which do not become part of the structure of the polymer.) Alternatively, if the hydrophilic monomers and/or the silicone-containing monomers act as the cross-linking agent, the addition of a crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone-containing monomer which can act as a crosslinking agent and, when present, does not require the addition of a crosslinking monomer to the reaction mixture includes α, ω-bismethacryloypropyl polydimethylsiloxane.

A polymerization catalyst is preferably included in the reaction mixture. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated hereintoforinto by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and the preferred method of polymerization initiation is visible light. The most preferred is bis(2,4,6-trimethylbenzoyl)-phenyl phosphine oxide (Irgacure 819®).

The monomer mix may contain additional components such as, but not limited to, UV absorbers, medicinal agents, antimicrobial compounds, reactive tints, pigments, copolymerizable and nonpolymerizable dyes, release agents and combinations thereof.

The preferred range of monofunctional silicone-containing monmers present in the monomer mix is from about 5 to 95 weight percent, more preferably about 30 to 85 weight percent, and most preferably about 40 to 75 weight percent of the reactive components in the monomer mix. The preferred range of hydrophilic monomer present in the above invention is from about 5 to 80 weight percent, more preferably about 10 to 60 weight percent, and most preferably about 20 to 50 weight percent of the reactive components in the monomer mix. The preferred range of diluent present in the above invention is from about 2 to 70 weight percent, more preferably about 5 to 50 weight percent, and most preferably about 15 to 40 weight percent of the total reaction mixture (including reactive and nonreactive components).

Preferred combinations of reactive components and diluents are those having from about 25 to about 60 weight % monofunctional silicone-containing components, about 20 to about 40 weight % hydrophilic monomer, from about 0.1 to about 5 wt % difunctional silicone containing component, from about 5 to about 20 weight % of an hydroxyl containing component, from about 0.2 to about 3 weight % of a crosslinking monomer, from about 0 to about 3 weight % of a UV absorbing monomer, from about 2 to about 10 weight % of an high molecular weight hydrophilic polymer (all based upon the weight % of all reactive components) and about 20 to about 50 weight % (weight % of all components, both reactive and non-reactive) of one or more of the claimed diluents.

The reaction mixtures of the present invention can be formed by any of the methods know to those skilled in the art, such as shaking or stirring, and used to form polymeric articles or devices by known methods.

For example, the biomedical devices of the invention may be prepared by mixing reactive components and the diluent(s) with a polymerization initator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product. Then, this polymer/diluent mixture is treated with a solvent to remove the diluent and ultimately replace it with water, producing a silicone hydrogel having a final size and shape which are quite similar to the size and shape of the original molded polymer/diluent article. This method can be used to form contact lenses and is further described in U.S. Pat. Nos. 4,495,313; 4,680,336; 4,889,664; and 5,039,459, incorporated herein by reference.

Haze is measured by placing a hydrated test lens in borate buffered saline in a clear 20×40×10 mm glass cell at ambient temperature above a flat black background, illuminating from below with a fiber optic lamp (Titan Tool Supply Co. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 1.0 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens.

The water content of contact lenses was measured as follows: Three sets of three lenses are allowed to sit in packing solution for 24 hours. Each lens is blotted with damp wipes and weighed. The lenses are dried at 60° C. for four hours at a pressure of 0.4 inches Hg or less. The dried lenses are weighed. The water content is calculated as follows:

$$\% \text{ water content} = \frac{(\text{wet weight} - \text{dry weight})}{\text{wet weight}} \times 100$$

The average and standard deviation of the water content are calculated for the samples are reported.

Modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Percent elongation is=[(Lf−Lo)/Lo]×100. Tensile modulus is measured at the initial linear portion of the stress/strain curve.

The advancing contact angle was measured as follows. Four samples from each set were prepared by cutting out a center strip from the lens approximately 5 mm in width and equilibrated in packing solution. The wetting force between the lens surface and borate buffered saline is measured at 23° C. using a Wilhelmy microbalance while the sample is being immersed into or pulled out of the saline. The following equation is used $$F = 2\gamma p \cos \theta \text{ or } \theta = \cos^{-1}(F/2\gamma p)$$

where F is the wetting force, y is the surface tension of the probe liquid, p is the perimeter of the sample at the meniscus and θ is the contact angle. The advancing contact angle is obtained from the portion of the wetting experiment where the sample is being immersed into the packing solution. Each sample was cycled four times and the results were averaged to obtain the advancing contact angles for the lens.

The Dk is measured as follows. Lenses are positioned on a polarographic oxygen sensor consisting of a 4 mm diameter gold cathode and a silver ring anode then covered on the upper side with a mesh support. The lens is exposed to an atmosphere of humidified 2.1% $O_2$. The oxygen that diffuses through the lens is measured by the sensor. Lenses are either stacked on top of each other to increase the thickness or a thicker lens is used. The L/Dk of 4 samples with significantly different thickness values are measured and plotted against the thickness. The inverse of the regressed slope is the Dk of the sample. The reference values are those measured on commercially available contact lenses using this method. Balafilcon A lenses available from Bausch & Lomb give a measurement of approx. 79 barrer. Etafilcon lenses give a measurement of 20 to 25 barrer. (1 barrer=$10^{-10}$ ($cm^3$ of gas×$cm^2$)/($cm^3$ of polymer×sec×cm Hg)).

The Examples below further describe this invention, but do not limit the invention. They are meant only to suggest a method of practicing the invention. Those knowledgeable in the field of contact lenses as well as other specialties may find other methods of practicing the invention. However, those methods are deemed to be within the scope of this invention. Some of the materials that are employed in the Examples are identified as follows:

DMA N,N-dimethylacrylamide
HEMA 2-hydroxyethyl methacrylate
mPDMS 800-1000 MW ($M_n$) monomethacryloxypropyl terminated mono-n-butyl terminated polydimethylsiloxane
Norbloc 2-(2'-hydroxy-5-methacrylyloxyethylphenyl)-2H-benzotriazole
PVP poly(N-vinyl pyrrolidone) (K value 90)
D3O 3,7-dimethyl-3-octanol
EGDMA ethyleneglycol dimethacrylate
CGI 819 bis(2,4,6-trimethylbenzoyl)-phenyl phosphine oxide
DVE bis(trimethylsiloxy)methylsilylpropyl-1,2-dimethacrylate

EXAMPLE

Preparation of bis(trimethylsiloxy)methylsilylpropyl-1,2-dimethacrylate

The following reactants were charged to a dry 100 mL, 3 neck round bottom flask equipped with a magnetic stirrer, thermocouple, and a drying tube in the order and amounts listed below:

| | |
|---|---|
| 1.47 g | lithium methacrylate (0.016 mole) |
| 12.9 mg | butylated hydroxytoluene |
| 16.17 g | methacrylic anhydride (0.105 mole) |
| 17.20 g | methacrylic acid (0.2 mole) |
| 33.60 g | glycidoxypropyl heptamethyltrisiloxane (0.1 mole) |

The mixture was stirred vigorously, and heated to 100° C. for 7.5 hours. Once the reaction was complete, it was allowed to cool to ambient conditions, and transferred to a 500 mL separatory funnel.

The organics were diluted with 100 mL of hexanes, washed with 3×200 mL of 0.5N aqueous NaOH, followed with 3×100 mL of 2.5% aqueous NaCl. The organics were dried with 5.0 g of sodium sulfate, and the material was filtered over a fritted glass funnel.

The filtrate was treated with 15 g of silica gel, and the system was triturated for 3 hours. The organics were filtered over a fritted glass funnel, and the trituration was repeated using an additional 15 g of silica gel for another 3 hours. The desired product was isolated after filtration over a fritted glass funnel, followed by evaporation of volatile components at 55° C. under a vacuum pf<10 mbar. The resultant bis(trimethylsiloxy)methylsilylpropyl-1,2-dimethacrylate was 89.9% pure.

Examples 1-4

Monomer mixes were made from the components listed in Table 1, using the following procedure.

The components were combined and mixed for approximately 4 hours at a temperature of about 30° C. A diluent comprising 72.5% t-amyl alcohol and 27.5% PVP K-12 was added at a ratio of 60% monomer mix to 40% diluent. The reactive monomer mix was dispensed into a front curve mold, then a back curve mold was affixed on top of the monomer mix. The assembled part was then passed down a tunnel with three zones heated to 67° C. in zone 1, 65° C. in zone 2 and 61° C. in zone 3, under visible light (intensity of 600, 800 and 800 mW/$cm^2$) to initiate the lens curing process. The total cure time was 3.75 minutes. After cure, the back curve mold was removed with the cured lenses and placed into a hydrating solution of 70:30 IPA/DI water, at ambient temperature for about 60 minutes, and then into DI water for about 120 minutes during which time the lenses released from the back cure mold and were removed from the back curve mold using a swab. The lenses were put into blister packages containing saline packaging solution, sealed and sterilized at 121° C. for 29 minutes.

TABLE 1

| | Monomer | | | |
|---|---|---|---|---|
| | 1 | 2 | 3 | 4 |
| MPDMS | 22 | 22 | 22 | 22 |
| SiMAA | 30 | 29.73 | 29.13 | 28.53 |
| DVE | 0 | 0.27 | 0.87 | 1.47 |
| DMA | 31 | 31 | 31 | 31 |

TABLE 1-continued

| | Monomer | | | |
|---|---|---|---|---|
| | 1 | 2 | 3 | 4 |
| HEMA | 8.5 | 8.5 | 8.5 | 8.5 |
| PVP | 6 | 6 | 6 | 6 |
| EGDMA | 0.75 | 0.75 | 0.75 | 0.75 |
| Norbloc | 1.5 | 1.5 | 1.5 | 1.5 |
| CGI 819 | 0.23 | 0.23 | 0.23 | 0.23 |
| Blue Hema | 0.02 | 0.02 | 0.02 | 0.02 |

The modulus and elongation of the lenses were measured and the results are shown in Table 2, below.

TABLE 2

| Ex # | % DVE* | Modulus (psi) | Elong (%) |
|---|---|---|---|
| 1 | 1.1 | 55 | 150 |
| 2 | 2 | 60 | 169 |
| 3 | 4 | 74 | 131 |
| 4 | 6 | 83 | 130 |

*based upon weight of SiMAA2

Figure 1:
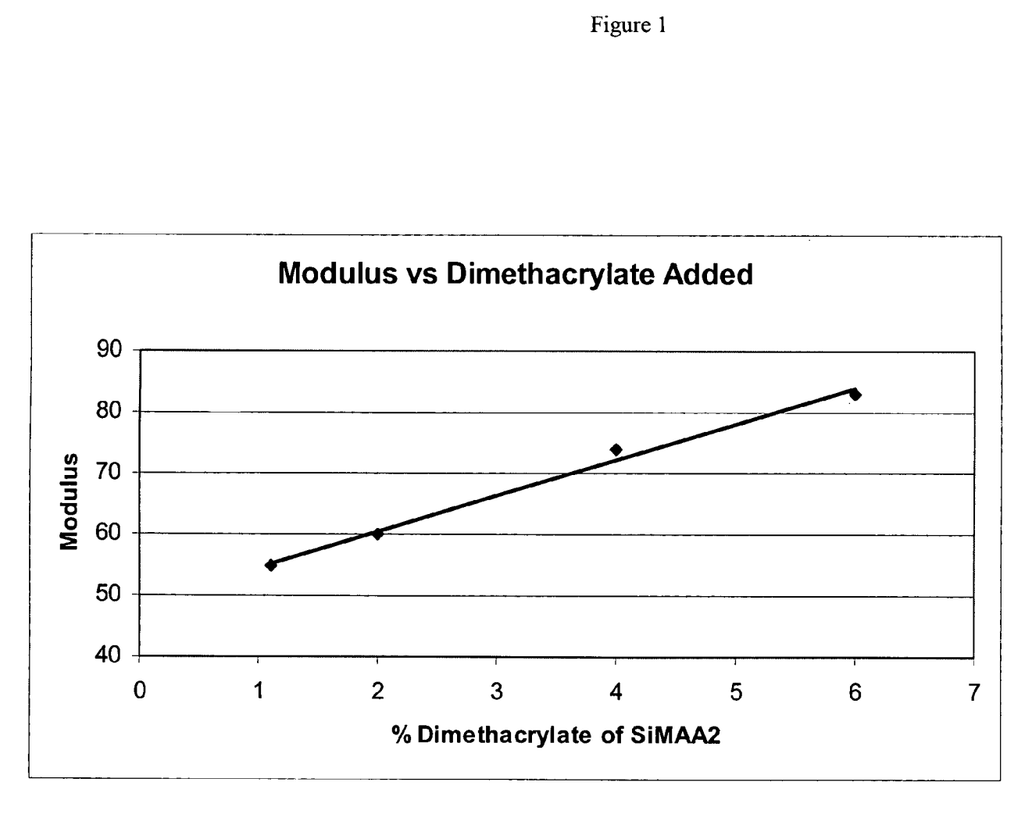
FIG. 1 is a graph plotting modulus v. % wt dimethacrylate.

The modulus is shown as a function dimethacrylate concentration in FIG. 1. Thus, FIG. 1, and the examples clearly show that mechanical properties may be controlled by adding a normalizing amount of at least one difunctional silicone-containing byproduct.

We claim:

1. A process comprising forming a monomer mixture comprising at least one monofunctional silicone containing component which comprises at least one difunctional byproduct; determining the concentration of said difunctional byproduct in said monofunctional silicone containing component; and adding to said monomer mixture a normalizing amount of said at least one difunctional byproduct and curing said monomer mixture to form a biomedical device.

2. The process of claim 1 wherein said normalizing amount is between about 0.1 and about 5%, based upon the weight of said monofunctional silicone-containing component.

3. The process of claim 1 wherein said normalizing amount is between about 1 and about 3%, based upon the weight of said monofunctional silicone-containing component.

4. The process of claim 1 wherein said monofunctional silicone containing component is selected from the group consisting of polysiloxanylalkyl(meth)acrylic monomers, hydroxyl functionalized silicone-containing monomers, poly(organosiloxane) prepolymer, vinyl carbonate monomers, vinyl carbamate monomers, polysiloxanes with a polar fluorinated graft or side group having a hydrogen atom attached to a terminal difluoro-substituted carbon atom and combinations thereof.

5. The process of claim 1 wherein said monofunctional silicone containing component comprises a polysiloxanylalkyl(meth)acrylic monomers of Formula I wherein: $R^{12}$ is H or lower alkyl;
X is O or $NR^{16}$; $R^{16}$ is independently selected from the group consisting of hydrogen or lower alkyl,
each $R^{13}$-$R^{15}$ is independently selected from the group consisting of lower alkyl radical or a phenyl radical, and b is 1 or 3 to 10.

6. The process of claim 1 wherein said wherein said monofunctional silicone-containing component is selected from the group consisting of methacryloxypropyl tris(trimethylsiloxy) silane, pentamethyldisiloxanyl methylmethacrylate, and methyldi(trimethylsiloxy)methacryloxymethyl silane.

7. The process of claim 1 wherein said wherein said monofunctional silicone-containing component comprises methacryloxypropyl tris(trimethylsiloxy)silane.

8. The process of any of claims 1, 6, or 7 wherein said difunctional silicone-containing byproduct comprises bis(trimethylsiloxy)methylsilylpropyl-1,2-dimethacrylate.

9. The process of claim 1 wherein said monofunctional silicone containing component is a hydroxyl-functionalized silicone containing monomer of Formula I wherein:
$R^1$ is selected from the group consisting of hydrogen and $C_{1-6}$alkyl;
$R^2$, $R^3$, and $R^4$, are independently selected from the group consisting of $C_{1-6}$alkyl, tri$C_{1-6}$alkylsiloxy, phenyl, naphthyl, substituted $C_{1-6}$alkyl, substituted phenyl, or substituted naphthyl
$R^5$ is hydroxyl, an alkyl group containing one or more hydroxyl groups; or $(CH_2(CR^9R^{10})_yO)_x)$—$R^{11}$ wherein y is 1 to 5, x is an integer of 1 to 100; $R^9$-$R^{11}$ are independently selected from the group consisting of H, alkyl having up to 10 carbon atoms and alkyls having up to 10 carbon atoms substituted with at least one polar functional group,
$R^6$ is a divalent group comprising up to 20 carbon atoms;
$R^7$ is a monovalent group that can polymerize under free radical and/or cationic polymerization and comprising up to 20 carbon atoms; and
$R^8$ is a divalent group comprising up to 20 carbon atoms.

10. The process of claim 9 wherein $R^1$ is hydrogen, $R^2$, $R^3$, and $R^4$ are independently selected from the group consisting of $C_{1-6}$alkyl and tri$C_{1-6}$alkylsiloxy;
$R^5$ selected from the group consisting of hydroxyl, —$CH_2OH$ or $CH_2CHOHCH_2OH$;
$R^6$ is selected from the group consisting of divalent $C_{1-6}$alkyl, $C_{1-6}$alkyloxy, $C_{1-6}$alkyloxy$C_{1-6}$alkyl, phenylene, naphthalene, $C_{1-12}$cycloalkyl, $C_{1-6}$alkoxycarbonyl, amide, carboxy, $C_{1-6}$alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-12}$cycloalkyl, where the substituents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl;
$R^7$ is selected from the group consisting of acrylate, styryl, vinyl, vinyl ether, itaconate group, $C_{1-6}$alkylacrylate, acrylamide, $C_{1-6}$alkylacrylamide, N-vinyllactam, N-vinylamide, $C_{2-12}$alkenyl, $C_{2-12}$alkenylphenyl, $C_{2-12}$alkenylnaphthyl, $C_{2-6}$alkenylphenyl$C_{1-6}$alkyl, vinyl ether and epoxide groups;

R⁸ is selected from the group consisting of divalent $C_{1-6}$alkyl, $C_{1-6}$alkyloxy, $C_{1-6}$alkyloxy$C_{1-6}$alkyl, phenylene, naphthalene, $C_{1-12}$cycloalkyl, $C_{1-6}$alkoxycarbonyl, amide, carboxy, $C_{1-6}$alkylcarbonyl, carbonyl, $C_{1-6}$alkoxy, substituted $C_{1-6}$alkyl, substituted $C_{1-6}$alkyloxy, substituted $C_{1-6}$alkyloxy$C_{1-6}$alkyl, substituted phenylene, substituted naphthalene, substituted $C_{1-2}$cycloalkyl, where the substituents are selected from one or more members of the group consisting of $C_{1-6}$alkoxycarbonyl, $C_{1-6}$alkyl, $C_{1-6}$alkoxy, amide, halogen, hydroxyl, carboxyl, $C_{1-6}$alkylcarbonyl and formyl.

11. The process of claim 1 wherein said monofunctional silicone-containing component is selected from the group consisting of (3-methacryloxy-2-hydroxypropyloxy)propyl-bis(trimethylsiloxy)methylsilane, (2-methacryloxy-3-hydroxypropyloxy)propylbis(trimethylsiloxy)methylsilane, (3-methacryloxy-2-hydroxypropyloxy)propyltris(trimethylsiloxy)silane, 3-methacryloxy-2-(2-hydroxyethoxy)propyloxy)propylbis(trimethylsiloxy)methylsilane, monomethacryloxypropyl terminated mono-n-butyl terminated polydimethylsiloxane, and mixtures thereof.

12. The process of claim 1 wherein said monofunctional silicone-containing component is selected from the group consisting of (3-methacryloxy-2-hydroxypropyloxy)propyl-bis(trimethylsiloxy)methylsilane), (2-methacryloxy-3-hydroxypropyloxy)propylbis(trimethylsiloxy)methylsilane, monomethacryloxypropyl terminated mono-n-butyl terminated polydimethylsiloxane, and mixtures thereof.

13. The process of claims 9, 10, 11 or 12 wherein said difunctional silicone-containing byproduct comprises bis(trimethylsiloxy)methylsilylpropyl-1,2-dimethacrylate.

14. The process of claim 1 wherein said monofunctional silicone-containing component is present in an amount between about 25 and about 60 weight %, based upon weight of all reactive components in the monomer mixture.

15. The process of claim 1 wherein said monomer mixture further comprises at least one hydrophilic component.

16. The process of claim 15 wherein said hydrophilic component is present in an amount between about 10 and about 60%, based upon weight of all reactive components in the monomer mixture.

17. The process of claim 15 wherein said hydrophilic component is selected from the group consisting of N,N-dimethyl acrylamide, 2-hydroxyethyl acrylate, glycerol methacrylate, 2-hydroxyethyl methacrylamide, N-vinylpyrrolidone, polyethyleneglycol monomethacrylate, and mixtures thereof.

18. The process of claim 15 wherein said hydrophilic component is selected from the group consisting of N,N-dimethyl acrylamide, 2-hydroxyethyl macrylate and mixtures thereof.

19. The process of claim 1 wherein said monofunctional silicone containing component comprises (3-methacryloxy-2-hydroxypropyloxy)propylbis(trimethylsiloxy)methylsilane, monomethacryloxypropyl terminated mono-n-butyl terminated polydimethylsiloxane and mixtures thereof, said at least one difunctional byproduct comprises bis(trimethylsiloxy)methylsilylpropyl-1,2-dimethacrylate and said monomer mixture further comprises at least one high molecular weight hydrophilic polymer, and at least one hydrophilic component is selected from the group consisting of N,N-dimethyl acrylamide, 2-hydroxyethyl macrylate and mixtures thereof.

20. The process of claim 1 wherein said biomedical device is an ophthalmic device.

21. The process of claim 1 wherein said biomedical device is a contact lens.

22. The process of claim 1 wherein only one difunctional byproduct is added to said monomer mixture.

* * * * *

UNITED STATES PATENT AND TRADEMARK OFFICE
CERTIFICATE OF CORRECTION

PATENT NO.        : 8,097,565 B2
APPLICATION NO.   : 10/861798
DATED             : January 17, 2012
INVENTOR(S)       : Gregory A. Hill Page 1 of 1

It is certified that error appears in the above-identified patent and that said Letters Patent is hereby corrected as shown below:

Col. 15, line 40, please insert the word -- weight -- between "5" and "%"

Col. 15, line 43, please insert the word -- weight -- between "3" and "%"

Col. 15, line 46, please insert a -- - -- between the words "silicone" and "containing"

Col. 15, line 55, please insert a -- - -- between the words "silicone" and "containing"

Col. 16, line 4, please amend the line to read "The process of claim 1 wherein said mono-functional . . ."

Col. 16, line 9, please amend the line to read "The process of claim 1 wherein said mono-functional . . ."

Col. 16, line 16, please insert a -- - -- between the words "silicone" and "containing"

Col. 16, line 48, please insert the word -- is -- between "$R^5$" and "selected"

Col. 18, line 5, please insert the word -- weight -- between "60" and "%"

Signed and Sealed this
Third Day of April, 2012

David J. Kappos
*Director of the United States Patent and Trademark Office*